United States Patent

[11] 3,559,747

| [72] | Inventor | Ted L. Cline<br>P. O. Box 38, Rush Springs, Okla. 73082 |
|---|---|---|
| [21] | Appl. No. | 729,358 |
| [22] | Filed | May 15, 1968 |
| [45] | Patented | Feb. 2, 1971 |

[54] DEEP TILLAGE PLOW
5 Claims, 4 Drawing Figs.

[52] U.S. Cl. ................................................. 172/421,
172/427; 280/43.2
[51] Int. Cl. ....................................................... A01b 63/16
[50] Field of Search ............................................. 172/419,
427, 421, 429, 504, 690; 306/1.5; 280/43.2

[56] References Cited
UNITED STATES PATENTS

| 2,269,519 | 1/1942 | Christenson | 172/427X |
| 1,346,432 | 7/1920 | Towner | 172/504X |
| 1,784,193 | 12/1930 | McOsker | 172/419X |
| 2,304,383 | 12/1942 | Strandlund | 172/419X |
| 3,077,231 | 2/1963 | Hamilton | 172/421 |
| 3,403,737 | 10/1968 | Byrd | 172/427X |

FOREIGN PATENTS

| 686,719 | 7/1930 | France | 172/427 |

Primary Examiner—Robert E. Pulfrey
Assistant Examiner—Stephen G. Pellegrino
Attorney—Dunlap, Laney, Hessin & Dougherty ABSTRACT: A plow which includes a V-shaped frame, a plurality of blade supporting brackets secured to the frame and spaced from each other therealong, an arcuate, forward sweep toothed blade secured to each of said brackets, and a pair of gauge wheel assemblies secured to the opposite ends of the frame. The gauge wheel assemblies are detachably mounted on the frame, and each includes a screw jack adjusting mechanism for raising and lowering the gauge wheels relative to the frame.

PATENTED FEB 2 1971
3,559,747
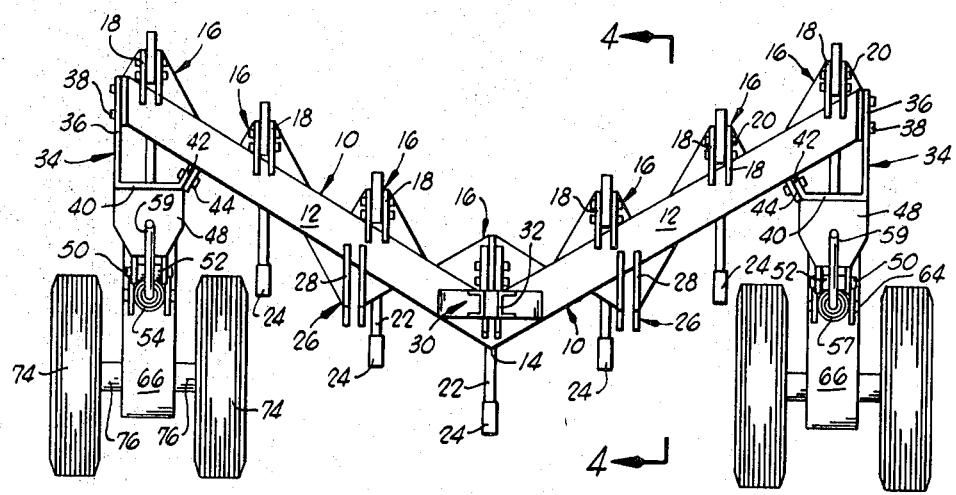
Fig. 1
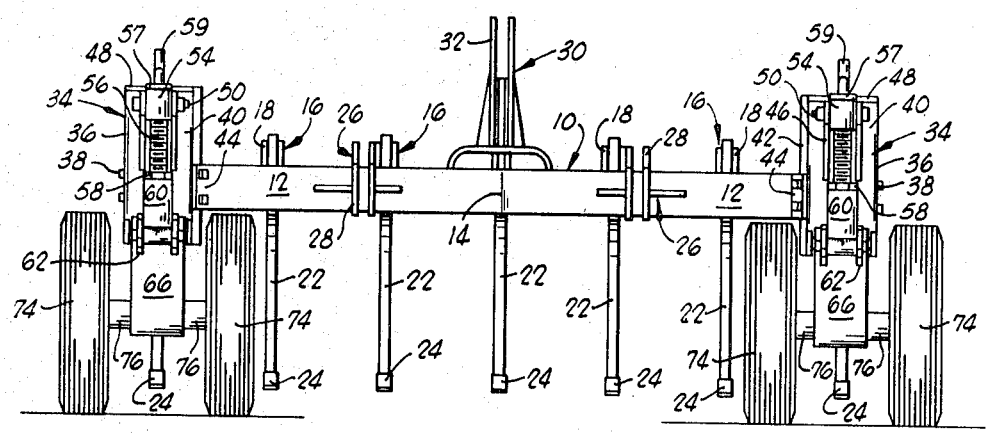
Fig. 2
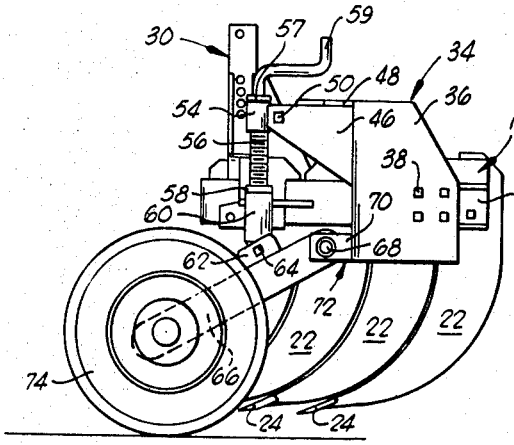
Fig. 3
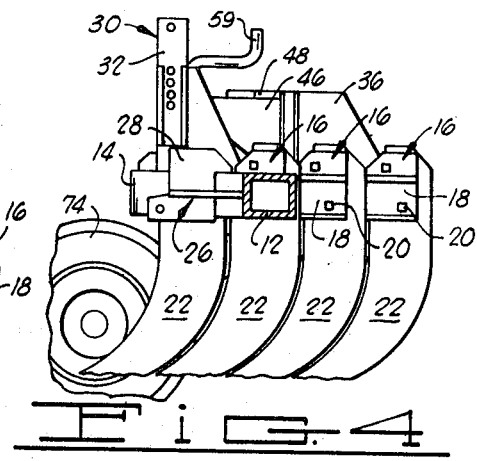
Fig. 4
INVENTOR.
TED L. CLINE
BY
ATTORNEYS

DEEP TILLAGE PLOW

BACKGROUND OF THE INVENTION

1. Field of the Invention

This invention relates to deep tillage or subsoiler type plows, and more particularly, to deep tillage plows having gauge wheels which can be adjusted in their relationship to the frame of the plow to control the depth to which the plow blades or tines penetrate the earth.

2. Brief Description of the Prior Art

For many years, the types of plows which were available for agricultural purposes included only relatively light turning plows which were utilized for the purpose of penetrating the topsoil and opening a furrow through a fairly shallow layer of the soil. In more recent years, the size of farm tractors has increased significantly as has the power of these machines. Consequently, it is now possible for these larger tractors to successfully pull heavier plows which have large arcuate sweep teeth or blades secured thereon which are capable of penetrating the subsoil to a considerable depth. Several plows of this type have been recently manufactured and successfully marketed. These plows, when used in conjunction with the more highly powered tractors, permit deep plowing and bedding to be accomplished in a single operation, and permit the breaking up of virgin subsoil, and the achievement of greater moisture retention in the soil.

It is desirable in deep tillage or subsoiling plows of this type that some means be provided for adjusting the depth to which the plow blades or tines will penetrate the soil. While lighter equipment can very frequently be adequately adjusted in plowing depth by manipulation of the hitch connections to the towing tractor, some of the subsoiling plows presently marketed are quite heavy, and this type of adjustment of depth is not an entirely satisfactory answer to this need. Accordingly, it has been proposed to provide gauge wheels on these plows for the purpose of permitting the relationship of the plow frame to the ground to be varied. Thus, as the gauge wheels contact and move along the ground, their spatial relationship with respect to the plow frame upon which they are mounted determines the position of the frame relative to the ground, and consequently determines ultimately the depth to which the blades of the plow will penetrate the earth.

Various arrangements have been made for permitting the gauge wheels to be adjusted relative to their position on the frame. In some cases, a very simple construction has been employed in which the gauge wheels are simply unbolted from one point of securement on the frame, and then rebolted to another point of securement to the frame. Though mechanically simple, and an inexpensive way of providing for such gauge wheel adjustment, this method obviously is time-consuming in practice, and entails an undesirable amount of physical exertion on the part of the farmer.

Other constructions which have been proposed for permitting gauge wheel adjustment include relatively complicated mechanisms which employ cranks, levers and the like for permitting either one or a plurality of the gauge wheels to be adjusted in its position on the frame, either by local adjustment at the frame or by remote adjustment from the tractor. In general, these mechanisms are relatively complicated and expensive, and because of their mechanical complexity, tend frequently to become jammed, or to bind, or to develop a mechanical malfunction which renders the entire tractor inoperative or, less seriously, prevents further gauge wheel adjustment until extensive repairs are effected.

BRIEF DESCRIPTION OF THE PRESENT INVENTION

This invention provides an improved deep tillage or subsoiler plow which carries heavy gauge wheels on the plow frame and includes mechanism for quickly and easily adjusting the position of the gauge wheels in relation to the frame. Broadly described, the deep tillage plow of the invention includes an elongated V-shaped frame which carries over its length a plurality of spaced blade supporting brackets. The blade supporting brackets each have detachably secured thereto an arcuate, forward sweep tooth blade.

Secured to the opposite end portions of the V-shaped frame are a pair of gauge wheel assemblies. These assemblies are detachably mounted on the frame, and each includes a screw jack adjusting mechanism for raising and lowering the gauge wheels relative to the frame. Each screw jack adjusting mechanism includes a wheel supporting arm which carries at one of its ends, a wheel mounting axle, and at its other end, a sleeve which is pivotally secured in a mounting bracket secured to the frame. Each gauge wheel adjusting assembly also includes a threaded shaft sleeve which is pivotally secured to the upper side of the wheel supporting arm for pivotation about a horizontal axis, and which threadedly receives the lower end of a threaded shaft. The threaded shaft is mounted for rotation about a vertical axis in a shaft collar disposed near the upper end of the threaded shaft. The shaft collar is pivotally mounted through a shaft collar bracket to the frame of the plow. A handle or other suitable means of rotating the threaded shaft is provided at the upper end of this shaft on the opposite side of the shaft collar from the threaded lower end of the shaft which extends into the threaded shaft sleeve.

The described structure permits the gauge wheels mounted on the plow frame to be quickly and easily adjusted in their positions relative to the frame of the plow, so that the teeth of the plow can be made to penetrate the earth to any depth desired. Thus, a major object of the invention of providing a versatile deep tillage plow which can be used for plowing to various depths is achieved.

An additional object achieved by the invention is the provision of a deep tillage or subsoiling plow which carries sets of heavy duty gauge wheels which may be easily manipulated in their relationship to the plow frame so as to preset the depth to which the plow blades will penetrate the earth.

A further object of the invention is to provide a simple gauge wheel adjusting mechanism for use in conjunction with the gauge wheels of a deep tillage plow, which mechanism is mechanically rugged and characterized in having a long and trouble free operating life.

An additional and more specific object of the invention is to provide a gauge wheel adjustment mechanism for use on deep tillage plows carrying gauge wheels, which mechanism can be easily utilized by a single person employing a single hand for adjusting the gauge wheels.

In addition to the described objects and advantages, additional objects and advantages will become apparent as the following detailed description of the invention is read in conjunction with the accompanying drawings which illustrate the invention.

BRIEF DESCRIPTION OF THE DRAWINGS

FIG. 1 is a plan view of a deep tillage plow constructed in accordance with the present invention.

FIG. 2 is a front elevational view of the plow illustrated in FIG. 1.

FIG. 3 is an end elevation view of the plow depicted in FIGS. 1 and 2 illustrating the plow as it appears when viewed from one of the ends of the framework carrying one of the gauge wheel assemblies.

FIG. 4 is a sectional view taken along line 4—4 of FIG. 1.

DETAILED DESCRIPTION OF A PREFERRED EMBODIMENT OF THE INVENTION

Referring initially to the drawings, and particularly to FIG. 1, the deep tillage plow of the invention includes a V-shaped frame designated generally by reference numeral 10. The V-shaped frame 10 includes a pair of arms 12. The arms 12 define an obtuse angle between them and intersect at a medial point or apex 14. Secured to the upper side of each of the arms 12 of the V-shaped plow 14 are a plurality of horizontally spaced blade supporting brackets 16. Each of the blade supporting brackets 16 includes a pair of parallel plates 18 which extend rearwardly from the V-shaped frame 10. A plurality of bolts 20 are extended through the plates 18 to secure the upper end portion of a forwardly swept plow blade or tine 22 in each of the blade supporting brackets 16. Each of the plow blades 22 carries at its lower, forward end, a hardened wear shoe 24. The configuration of the forwardly swept blades or tines 22 can be best perceived by referring to FIGS. 2—4 of the drawings.

As has been previously explained, the deep tillage plow of the invention is utilized by connecting it behind a tractor or similar towing vehicle. As is conventional practice, the plow is constructed to facilitate connection to a three-point connection or hitch of the type commonly used on agricultural tractors. To this end, the pair of outer hitch brackets designated generally by reference numeral 26 are secured to the upper side of the bars 12 at an outwardly spaced position from the apex 14 of the frame 10. The outer hitch brackets 26 each include a pair of parallel plates 28 which are apertured to receive a suitable hitch pin (not shown). A central hitch bracket 30 is secured to the frame 10 at the apex 14 and includes a pair of vertically extending parallel plates having aligned apertures in their upper portions to facilitate connection of the hitch bracket 30 to the center hitch of a three-point connection assembly on the tractor.

Secured to the free ends of each of the bars 12, or stated differently, at the opposite ends of the V-shaped frame 10, are a pair of gauge wheel assemblies designated generally by reference numeral 34. Each of the gauge wheel assemblies 34 includes a mounting bracket which comprises a relatively large end plate 36 which is secured by bolts 38 or other suitable means to the ends of the bars 12 of the frame 10. The end plates 36 of each gauge wheel assembly 34 are welded at a right angle to a face plate 40 which is welded to a diagonal plate 42 along its edge opposite the edge secured to the end plate 36. Each diagonal plate 42 is bolted to a bracket plate 44 which is welded to the respective arm 12 of the frame 10 at a location spaced inwardly from the end of the arm. It will thus be seen that the gauge wheel assemblies 34 can be quickly attached and detached from the frame 10 as may be desired.

Welded or otherwise suitably secured to the forward face of each face plate 40 are a pair of parallel brace plates 46. Each of the pairs of brace plates 46 has secured across the upper edges thereof, a cap plate 48 and receive at the free or unwelded forward edges, a transversely extending pivot pin 50. The pivot pin 50 passes through and journals a sleeve 52 positioned between the brace plates 46. The sleeve 52 is rotatable about the axis of the pivot pin. The sleeve 52 is secured to a shaft collar 54 having a vertically extending bore therethrough and rotatably journaling the upper end of an adjustment shaft 56 which is threaded at its lower end. At its upper end, each of the adjustment shafts 56 carries a flange 57 which rides on the top of the respective shaft collar 54 and is secured to a hand crank 59. The portion of each shaft 56 between the flange 57 and the threads thereon is necked down to a reduced diameter to allow the upper end of each shaft to be extended through the respective collar 54 before the respective flange 57 is welded in place. This construction prevents axial movement of each shaft 56 in its respective collar. The lower end of each threaded nut 58 which is welded to the upper end of a shaft sleeve 60 which receives the lower end of the threaded shaft. The shaft sleeve 60 is pivotally connected to a sleeve bracket 62 by means of a suitable horizontally extending pivot pin 64.

Each sleeve bracket 62 is welded to the upper side of an elongated wheel supporting arm 66. Each of the wheel supporting arms 66 is pivotally journaled on a horizontally FIGS. pivot pin 68 which extends between a pair of parallel plates 70 forming an arm bracket designated generally by reference numeral 72. The parallel plates 70 of each arm bracket 72 are welded to the face plate 40 of the respective gauge wheel assembly 34. At their ends opposite the ends journaled in the arm brackets 72, each of the wheel supporting arms 66 extends between a pair of ground engaging gauge wheels 74. The gauge wheels 74 are journaled on axles 76 which extend from the opposite sides of each wheel supporting arm 66 as best illustrated in z2 1 and 2.

OPERATION

In the use of the deep tillage plow of the invention, the outer hitch brackets 26 are connected to the outer connections of the three-point hookup connection of an agricultural tractor. The central hitch bracket 30 is connected to the central connection of the three-point hookup. Either prior to or after this time, the gauge wheel assemblies 34 are secured in position by bolting the end plates 36 of the gauge wheel assemblies to the ends of the bars 12 of the V-shaped frame 10 with suitable bolts 38, and by bolting the diagonal plates 42 to the bracket plates 44 spaced inwardly from the end of the bars 12 of the frame 10. The position of the gauge wheels 74 with respect to the frame 10 can then be adjusted by means of the screw jack adjusting mechanism hereinbefore described.

As the hand crank 59 is rotated, the threaded portion of the adjustment shaft 56 is threaded further into or out of the threaded nut 58. The result of this movement of the shaft 56 is to force the shaft sleeve 60 and the threaded nut 58 toward or away from the shaft collar 54, depending upon the direction of rotational movement of the hand crank 59. In FIG. 3 of the drawings, a position of the gauge wheels is illustrated in which the shaft sleeve 60 has been forced downwardly away from the shaft collar 54. This movement causes the shaft sleeve 60 to pivot about the pivot pin 64 which pivotally connects it to the sleeve bracket 62. At the same time, the sleeve bracket 62 and the wheel supporting arm 66 is forced downwardly so that the wheel supporting arm pivots about the pivot pin 68 which pivotally supports it in the parallel plates 70 of the arm bracket 72. This pivotal movement of the wheel supporting arm 66 depresses the outer end of the arm and moves the gauge wheels 74 downwardly with respect to the frame 10.

If it should be desired to elevate the gauge wheels 74 relative to the V-shaped frame 10, this is accomplished by rotating the hand crank 59 in a direction which will screw the threaded portion of the adjustment shaft 56 into the threaded nut 58. This draws the shaft sleeve 60 upwardly to, in turn, draw the wheel supporting arm 66 upwardly about its horizontal pivotal axis in the pivot pin 68.

It will be perceived that, by manipulation of the hand crank 59 associated with each of the gauge wheel assemblies 34, the gauge wheel 74 located at the opposite ends of the V-shaped frame 10 can be independently adjusted in their vertical relationship to the frame 10. It should also be pointed out that the gauge wheel assemblies 34 can be quickly attached or detached from the arms 12 of the V-shaped frame so that the deep tillage plow can be allowed to penetrate the soil to the maximum depth which it is capable of attaining, if this mode of operation should be desirable in any situation. Moreover, the quick detachable characteristic of the gauge wheel assemblies 34 permits them to be quickly removed from the frame 10 in the event maintenance is required which cannot be locally performed.

From the foregoing description of the invention, it is believed that it will be apparent that the structure of the deep tillage plow of the invention permits versatile operation of the plow and adjustment of the depth to which the forward sweep tooth blades 22 will be permitted to penetrate the soil. Moreover, adjustment of the gauge wheels can be accomplished manually with a single hand, and the relative simplicity and mechanical reliability of the mechanism employed avoids the necessity for frequent or expensive repairs.

Although a preferred embodiment of the invention has been illustrated in the accompanying drawings and described in the foregoing specification, it will be understood that various changes and modifications can be effected in the described and depicted structure without departure from the basic principles which underlie the invention. All changes and innovations of this type which continue to rely on these principles are

I claim:

1. A deep tillage plow comprising:
a horizontally extending V-shaped frame having a pair of free ends and defining an angle at the central portion thereof;
a plurality of spaced plow blades detachably secured to said frame and extending downwardly therefrom; and
a pair of gauge wheel assemblies detachably mounted on the frame at the opposite ends thereof, each of said gauge wheel assemblies comprising:
an end plate secured to one of the free ends of the frame;
a diagonal plate secured to the frame intermediate said central portion of the frame and said one free end thereof;
a face plate secured between said diagonal plate and said end plate;
parallel plate means projecting from said face plate;
a shaft collar pivotally secured between said parallel plate means for pivotation about a horizontal axis;
an elongated wheel supporting arm having a first end and having a second end pivotally secured to said mounting bracket means for pivotation about a horizontal axis spaced downwardly from the horizontal pivotal axis of said shaft collar;
a ground engaging wheel rotatably journaled on the first end of said wheel supporting arm;
sleeve means pivotally secured to said wheel supporting arm between the ends thereof for pivotation about a horizontal axis;
elongated shaft means extending through and journaled in said shaft collar and extending to and engaging said sleeve means; and
means changing the axial spacing of said shaft collar relative to said sleeve means along the axis of said shaft means as said shaft means is rotated about its longitudinal axis.

2. A deep tillage plow comprising:
a horizontally extending V-shaped frame having a pair of free ends and defining an angle at the central portion thereof;
a plurality of spaced plow blades detachably secured to said frame and extending downwardly therefrom; and
a pair of gauge wheel assemblies detachably mounted on the frame at opposite ends thereof, each of said gauge wheel assemblies comprising:
mounting bracket means detachably secured to said frame and comprising:
an endplate secured to one of the free ends of the frame;
a diagonal plate secured to said frame intermediate said central portion of said frame and said one free end thereof;
a face plate secured between the diagonal plate and said endplate;
a pair of parallel, vertically extending brace plates projecting from said faceplate on the opposite side thereof from said frame; and
a pair of parallel, vertically extending arm bracket plates projecting from said faceplate below said brace plates;
a shaft collar pivotally secured between said brace plates for pivotation about a horizontal axis;
an elongated wheel supporting arm having a first end and having a second end pivotally secured between said arm bracket means for pivotation about a horizontal axis spaced downwardly from the horizontal pivotal axis of said shaft collar;
a ground engaging wheel rotatably journaled on the first end of said wheel supporting arm;
sleeve means pivotally secured to said wheel supporting arm between the ends thereof for pivotation about a horizontal axis;
elongated shaft means extending through and journaled in said shaft collar and extending to and engaging said sleeve means;
threads on said shaft means; and
threads on said sleeve means threadedly engaging the threads on said shaft means.

3. A deep tillage plow comprising:
a horizontally extending frame having a pair of free outer ends;
a plurality of spaced plow blades secured to said frame and extending downwardly therefrom; and
a pair of gauge wheel assemblies detachably mounted on the frame at the opposite free ends thereof, each of said gauge wheel assemblies comprising:
mounting bracket means detachably secured to said frame and comprising:
a plate detachably secured to one of the free ends of the frame; and
a pair of parallel plates projecting forwardly with respect to the frame;
a shaft collar pivotally secured between said parallel plates for pivotation about a horizontal axis;
an elongated wheel supporting arm having a first end and having a second end pivotally secured to said mounting bracket means for pivotation about a horizontal axis spaced downwardly from the horizontal pivotal axis of said shaft collar;
a ground engaging wheel rotatably journaled on the first end of said wheel supporting arm;
a sleeve pivotally secured to said wheel supporting arm between the ends thereof for pivotation about a horizontal axis;
an elongated threaded shaft extending through and journaled in said shaft collar;
a flange around the outside of said shaft and bearing against the upper side of said shaft collar for preventing said shaft from moving downwardly therethrough; and
a threaded nut secured to an upper end of said sleeve and having the opening therethrough aligned with the bore through said sleeve, said nut threadedly engaging the lower end of said threaded shaft; and
means for rotating said threaded shaft secured to the upper end thereof.

4. A deep tillage plow comprising:
a horizontally extending frame having a pair of free outer ends;
a plurality of spaced plow blades mounted on said frame and extending downwardly therefrom; and
a pair of gauge wheel assemblies mounted on the frame adjacent the opposite free ends thereof, each of said gauge wheel assemblies comprising:
mounting bracket means detachably secured to said frame and including parallel plates projecting forwardly with respect to the frame;
a shaft collar pivotally secured to said parallel plates for pivotation about a horizontal axis;
an elongated wheel supporting arm having a first end and having a second end pivotally secured to said mounting bracket means for pivotation about a horizontal axis spaced downwardly from the horizontal pivotal axis of said shaft collar;
a ground engaging wheel rotatably journaled on the first end of said wheel supporting arm;
sleeve means pivotally secured to said wheel supporting arm between the ends thereof for pivotation about a horizontal axis;
an elongated threaded shaft extending through and journaled in said shaft collar and extending to and engaging said sleeve means;

means on the outside of said shaft and bearing against the upper side of said shaft collar for preventing said shaft from moving downwardly therethrough; and means for rotating said threaded shaft secured to the upper end thereof.

5. A deep tillage plow comprising:

a horizontally extending V-shaped frame having a pair of free ends and defining an angle at the central portion thereof;

a plurality of spaced arcuate plow blades mounted on said frame and extending downwardly therefrom; and a pair of gauge wheel assemblies detachably mounted on the frame at the opposite ends thereof, each of said gauge wheel assemblies comprising:

mounting bracket means detachably secured to said frame and including parallel plates projecting forwardly with respect to said frame;

a shaft collar pivotally secured to said parallel plates for pivotation about a horizontal axis;

an elongated wheel supporting arm having a first end and having a second end pivotally secured to said mounting bracket means for pivotation about a horizontal axis spaced downwardly from the horizontal pivotal axis of said shaft collar;

a ground engaging wheel rotatably journaled on the first end of said wheel supporting arm;

sleeve means pivotally secured to said wheel supporting arm between the ends thereof for pivotation about a horizontal axis and having threads thereon;

an elongated shaft having threads thereon and extending through and journaled in said shaft collar, and extending to, and engaged by the threads thereon to, the threads on said sleeve means;

a flange on the outside of said shaft and bearing against the upper side of said shaft collar limiting movement of said shaft means through said collar in the direction of said sleeve means; and a hand crank positioned on the opposite side of said collar from said sleeve means.